(12) United States Patent
Nukada et al.

(10) Patent No.: US 8,667,262 B2
(45) Date of Patent: Mar. 4, 2014

(54) INFORMATION PROCESSING APPARATUS AND ITS CONTROL METHOD

(75) Inventors: Masaru Nukada, Kawasaki (JP); Nobuhiro Takano, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 372 days.

(21) Appl. No.: 12/970,341

(22) Filed: Dec. 16, 2010

(65) Prior Publication Data

US 2011/0087873 A1    Apr. 14, 2011

Related U.S. Application Data

(63) Continuation of application No. PCT/JP2008/061408, filed on Jun. 23, 2008.

(51) Int. Cl.
*G06F 9/00* (2006.01)
*G06F 9/24* (2006.01)
*G06F 15/177* (2006.01)

(52) U.S. Cl.
USPC .................................................. 713/2; 713/1

(58) Field of Classification Search
USPC ........................................................ 713/1, 2
See application file for complete search history.

(56) References Cited

U.S. PATENT DOCUMENTS

| 5,974,517 A * | 10/1999 | Gaudet ........................... 711/173 |
| 6,591,376 B1 * | 7/2003 | VanRooven et al. ............. 714/36 |
| 6,993,642 B2 | 1/2006 | Burkhardt et al. |
| 6,993,649 B2 * | 1/2006 | Hensley .............................. 713/2 |
| 2005/0083749 A1 * | 4/2005 | Keohane et al. ............... 365/222 |
| 2006/0085666 A1 * | 4/2006 | Stakutis et al. .................... 714/2 |
| 2007/0234022 A1 * | 10/2007 | Prasse et al. ....................... 713/1 |
| 2008/0256352 A1 * | 10/2008 | Chow et al. ........................ 713/2 |
| 2009/0144532 A1 * | 6/2009 | Arafeh ............................... 713/2 |

FOREIGN PATENT DOCUMENTS

| JP | 64-26259 | 1/1989 |
| JP | 2-300932 | 12/1990 |
| JP | 02-300932 A | 12/1990 |
| JP | 11-96059 | 4/1999 |
| JP | 11-096059 A | 4/1999 |
| JP | 2003-99268 | 4/2003 |

OTHER PUBLICATIONS

Taizo Sueyasu, "Raid Heiyou Niyoru Shinraisei Kakuho to Snap Shot No Riyouhou," Nikkei Linux, Nikkei Business Publications Inc., Mar. 8, 2002, vol. 4 No. 3, pp. 119-124.

(Continued)

*Primary Examiner* — Kim Huynh
*Assistant Examiner* — Brandon Kinsey
(74) *Attorney, Agent, or Firm* — Staas & Halsey LLP (57) ABSTRACT

An information processing apparatus includes: a first recording medium that stores a first system controller for allowing to execute boot processing of the information processing apparatus and is accessed by using a first access path in a tree structure or by using a second access path based on a first conversion table representing a correspondence between the first and second access path; a memory disk generation section allowing to secure a memory disk section that operates as a second recording medium and is accessed by using a third access path; a conversion table generation section allowing to generate a second conversion table representing a correspondence between the second and third access path; and a duplication controller allowing to copy the first system controller onto the memory disk section as a second system controller and allowing to duplicate the first and second system controllers based on the second conversion table.

9 Claims, 11 Drawing Sheets

(56) References Cited

OTHER PUBLICATIONS

Hiroaki Aoki, "Kasou Storage Tettei Katsuyou No Point, Software Design," Gijutsu-Hyohron Co., Ltd., Sep. 18, 2004, No. 167, pp. 57-64.

Jim Mauro, Solaris International, Kabushiki Kaisha Pearson Education, Dec. 20, 2001, First Edition, pp. 109-125.

English Translation of the International Preliminary Report on Patentability issued Feb. 8, 2011 in corresponding International Patent Application PCT/JP2008/061408.

Japanese Office Action issued Aug. 14, 2012 in corresponding Japanese Patent Application No. 2010-517609.

Japanese Office Action mailed Mar. 5, 2013 for corresponding Japanese Application No. 2010-517609.

Inuma Kazunori, "UNIX prescription", Softbankcreative Co., 2006, pp. 172-175.

International Search Report for PCT/JP2008/061408, mailed Aug. 12, 2008.

* cited by examiner

| PHYSICAL PATH | /devices/pci@17,4000/scsi@3/sd@1,0:b |
|---|---|
| LOGICAL PATH | /dev/dsk/c1t0d0 |

FIG. 8

| PHYSICAL PATH | /devices/pci@17,4000/mem@3/sd@0,0:a |
|---|---|
| LOGICAL PATH | /dev/dsk/c2t0d0 |

FIG. 9

| PHYSICAL PATH | /devices/pci@17,4000/scsi@3/sd@1,0:b |
|---|---|
| | /devices/pci@17,4000/mem@3/sd@0,0:a |
| LOGICAL PATH | /dev/dsk/c1t0d0 |

| PHYSICAL PATH | /devices/pci@17,4000/scsi@3/sd@1,0:b |
|---|---|
| LOGICAL PATH | /dev/dsk/c1t0d0 |

INFORMATION PROCESSING APPARATUS AND ITS CONTROL METHOD

CROSS-REFERENCE TO RELATED APPLICATIONS

This application is a continuation application, filed under 35 U.S.C. §111(a), of PCT Application No. PCT/JP2008/061408, filed Jun. 23, 2008, the disclosure of which is herein incorporated in its entirety by reference.

FIELD

The present invention relates to a boot system of an operating system in an information processing apparatus.

BACKGROUND

An operating system (OS) includes a kernel (core kernel) that controls basic management of a CPU (Central Processing Unit) or a main memory, and a daemon that provides various services to a user or an application.

Figure 11:
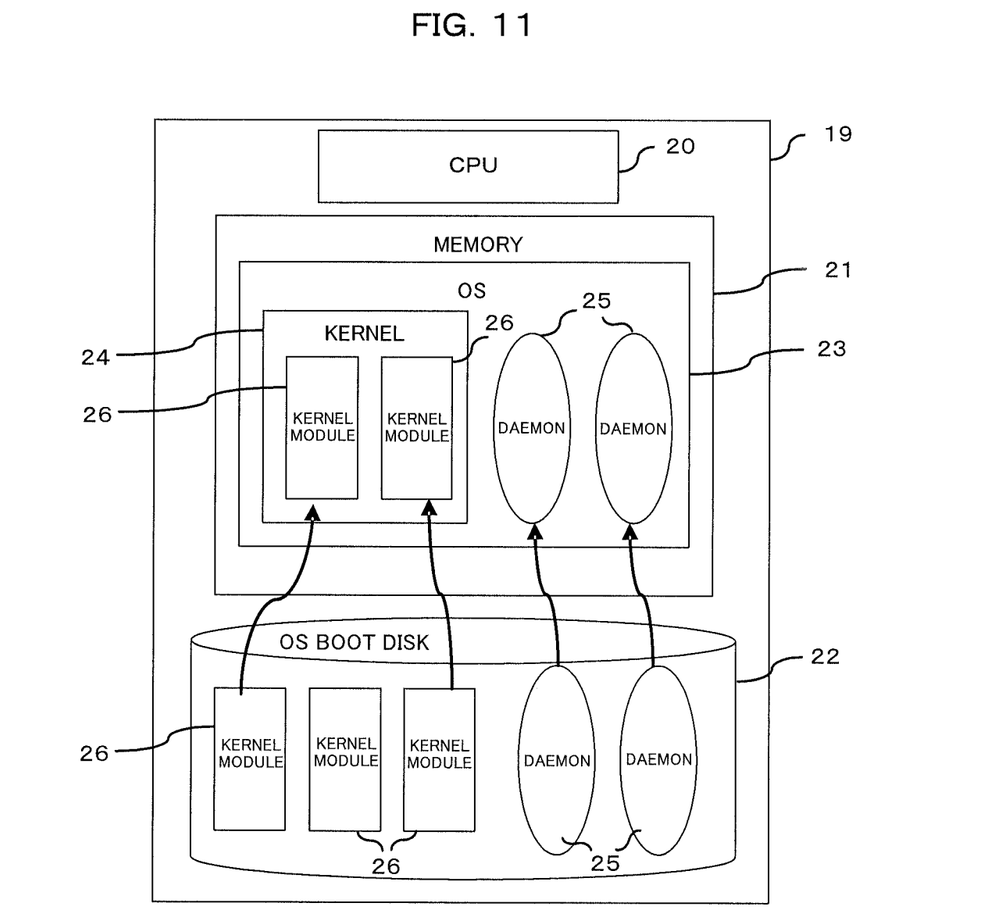
FIG. 11 is a conceptual view illustrating an internal configuration of a conventional OS and a state where kernel modules and daemons are acquired from a boot disk.

FIG. 11 is a conceptual view illustrating an internal configuration of a conventional OS and a state where kernel modules and daemons are acquired from a boot disk. Throughout the drawings, the same reference numerals are used to designate the same or corresponding component parts, and redundant descriptions are omitted. A computer 19 illustrated in FIG. 11 includes a CPU 20 as a processor, a memory 21 as a main memory, and a boot disk 22. The memory 21 includes an OS 23 loaded from the boot disk 22. The OS 23 includes a kernel 24 and daemons 25. The kernel 24 includes kernel modules 26.

The CPU 20 executes all processing performed on the computer 19. The memory 21 is a volatile storage device. The boot disk 22 contains a program to be loaded on the memory 21 and is, e.g., a HDD. The kernel module 26 is a module program constituting the kernel 24.

As illustrated in FIG. 11, the kernel 24 has a module structure. That is, the kernel 24 is provided on the boot disk not as one binary object, but the kernel modules 26 and daemons 25 which are main components of the OS 23 are loaded from the boot disk 22 at the boot time of the OS 23 and thereby a kernel image is gradually expanded on the memory 21. Similarly, after the boot of the OS 23, the kernel modules 26 and daemons 25 are incorporated in the kernel 24 according to requirement from a system.

The kernel module 26 is, e.g., a device driver. The device driver is a component that controls an I/O device such as a disk and a tape device. The device driver is resident in the kernel and controls the interface between a device and kernel. The device driver is implemented in the kernel as a dynamically loadable module and is provided as an individual binary file for each device type. The device driver is automatically loaded at the initial access time to a corresponding device.

The kernel 24 provides a logical path for enabling a user to access to a disk in addition to a physical path indicating a physical disk position and manages the logical and physical paths in association with each other. This is because, in the case where a user handles a physical device such as a disk, the physical path of the device is not directly specified, but the physical path needs to be converted to the logical path for easy handling of the OS.

In order for the OS 23 to be booted, a not illustrated firmware expands the program of the OS 23 stored in the boot disk 22 onto the memory 21, and processing runs according to a procedure written in the program. The kernel 24 is booted first, followed by start-up of the services of the daemons 25.

Hereinafter, details of OS boot processing (kernel initialization) in a conventional OS boot system will be described.

Figure 12:
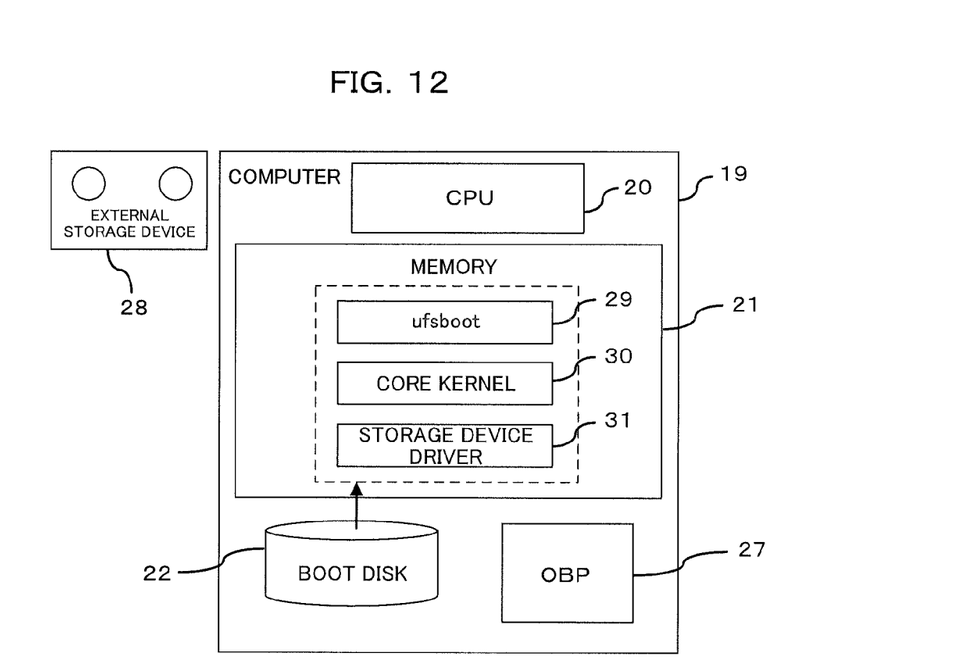
FIG. 12 is a block diagram illustrating an example of a configuration of a computer in a conventional OS boot system.
Figure 13:
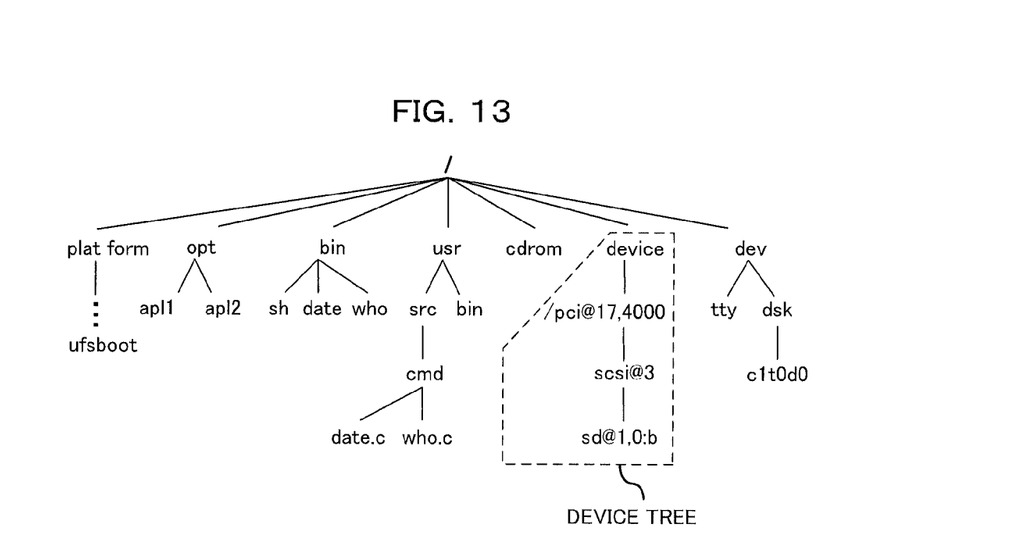
FIG. 13 is a conceptual view of a tree structure of a root file system constituting a boot disk.

FIG. 12 is a block diagram illustrating an example of a configuration of a computer in a conventional OS boot system. FIG. 13 is a conceptual view of a tree structure of a root file system constituting a boot disk. A computer 19 illustrated in FIG. 12 includes a CPU 20, an OBP (Open Boot Program) 27, a boot disk 22, a memory 21, and an external storage device 28. The memory 21 includes a ufsboot 29, a core kernel 30, and a storage device driver 31 which are expanded by programs to be described later.

The OBP 27 is a ROM that is booted first at power-on time, in which a firmware program that performs OS boot processing is recorded. The external storage device 28 is a storage device, such as a tape drive, in which backup data of the boot disk 22 has been stored as a hedge against a failure of the boot disk 22.

The ufsboot 29 is a boot program. The core kernel 30 performs incorporation of the kernel module or daemon as initialization of the kernel. The storage device driver 31 is a driver for the storage device. The above three programs are stored in the boot disk 22.

The boot disk 22 has a file structure created in a tree form called "root file system" as illustrated in FIG. 13 for reading/writing of recorded information. This file structure is represented as a tree having a single root node called "root (/)". By connecting the logical path of the boot disk 22 and root (/) of the root file system using a mount command provided by the OS, access to files recorded on the boot disk 22 is made possible. The above association is called "mount".

Next, operation of kernel initialization in the conventional OS boot system will be described.

Figure 14:
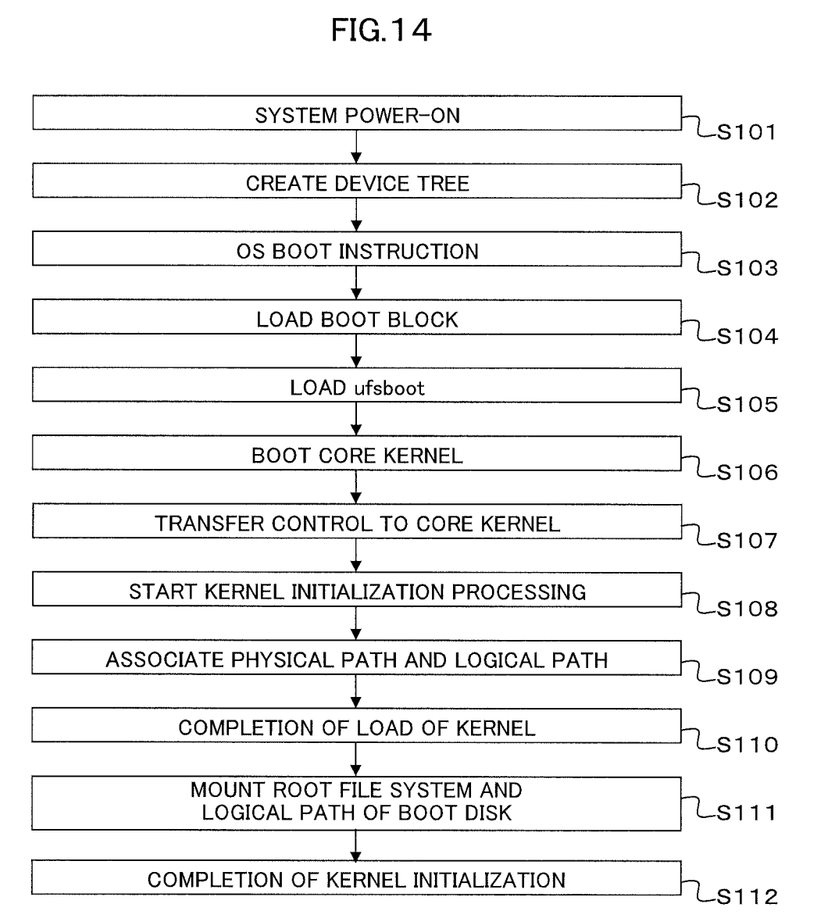
FIG. 14 is a flowchart of OS boot processing of the computer in the conventional OS boot system.

FIG. 14 is a flowchart of the OS boot processing of the computer in the conventional OS boot system. All the processing involved in the OS boot, including the following program execution processing of the OBP, are executed by the CPU 20. First, when power of the computer 19 is turned on by a user (S101), the OBP 27 starts an automatic boot process to recognize a hardware configuration and creates a device tree as illustrated in FIG. 13 (S102). The device tree is physical device configuration information.

After creating the device tree, the OBP 27 issues an OS boot instruction (S103) and expands a boot block stored in the beginning of the boot disk 22 on the memory 21 (S104). The storage location of the ufsboot 29 which is a boot program stored in the root file system constructed on the boot disk 22 has been written in the boot block. The OBP 27 reads the ufsboot 29 with reference to the written storage location and loads the ufsboot 29 onto the memory 21 (S105). The loaded ufsboot 29 boots the core kernel 30 (S106) and transfers control to the core kernel 30 (S107).

As illustrated in FIG. 13, after the transfer of the control to the core kernel 30, the core kernel 30 mounts (/=/devices/pci@17, 4000/scsi@3/sd@1, 0:b), in a read-only attribute, a physical path (/devices/pci@17, 4000/scsi@3/sd@1, 0:b) which has been given from the ufsboot 29 for enabling access to the boot disk 22 as a physical device and the root (/) of the root file system. After the mount of the physical path and root of the root file system, the core kernel 30 searches the root file system for a kernel module required for the kernel initialization, loads the found kernel module onto the memory 21, and starts the kernel initialization processing (S108). After the start of the kernel initialization processing, the core kernel 30 associates the logical path for the OS to access the boot disk 22 as a logical device with the physical path of the boot disk 22 (S109), whereby the load of the kernel is completed (S110).

Figure 15:
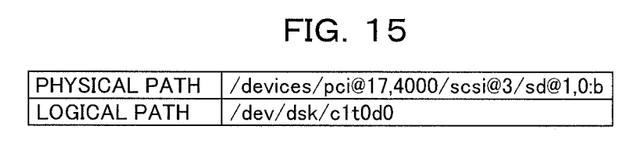
FIG. 15 is a table representing a correspondence between the physical path and logical path of the boot disk in the conventional OS boot system.

FIG. 15 is a table representing a correspondence between the physical path and logical path of the boot disk in the conventional OS boot system. As illustrated in FIG. 15, the core kernel 30 associates the physical path (/devices/pci@17,4000/scsi@3/sd@1, 0:b) and logical path (/dev/dsk/c1t0d0) of the boot disk 22 to thereby create the correspondence table. The core kernel 30 receives a given logical path from a user at access time and refers to the correspondence table to determine to which physical device specified by a physical path a logical device specified by the logical path corresponds.

As illustrated in FIG. 14, after the association between the logical and physical paths, the core kernel 30 refers to the disk mount correspondence table (/→/dev/dsk/c1t0d0) previously retained in the boot disk 22 to remount (/=/dev/dsk/c1t0d0), in a readable/writable attribute, the logical path (/dev/dsk/c1t0d0) of the boot disk on the root (/) of the root file system, as illustrated in FIG. 13 (S111). The above mount allows access to a file stored on the boot disk 22, whereby the kernel initialization processing is completed (S112).

The kernel module incorporates a component required by the system even after the boot of the OS in the kernel as needed, so that the access to the boot disk needs to be guaranteed at all times, and unmount of the root file system cannot be made until the system is stopped (only the attribute representing availability of reading/writing can be changed). The unmount is to eliminate the mount and, more specifically, to release association between the paths established by the mount using an unmount command provided by the OS.

The kernel initialization is achieved by the above processing. Meanwhile, a backup system as described below is prepared in the computer for a failure of the OS boot disk.

Figure 16:
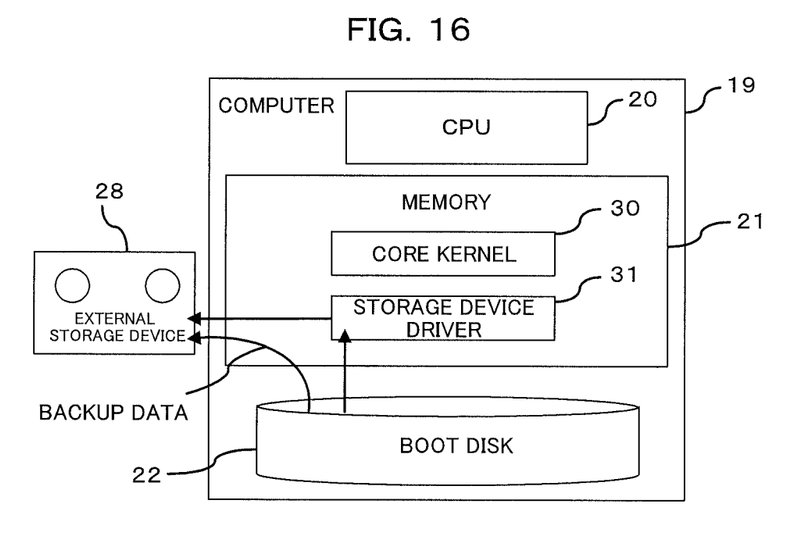
FIG. 16 is a conceptual view of a conventional boot disk backup system.

FIG. 16 is a conceptual view of a conventional boot disk backup system. As illustrated in FIG. 16, the core kernel 30 loads the storage device driver 31 stored in the boot disk 22 onto the memory 21 to activate the storage device driver 31 to thereby recognize the external storage device 28 and then copies data of the boot disk 22 to the external storage device 28. With the above processing, backup data of the boot disk 22 is stored in the external storage device 28 as a hedge against a failure of the boot disk 22.

In the case where the backed up data of the boot disk is written back, the boot disk itself that has booted the system is subjected to overwrite, so that it is necessary to boot the OS from another system disk. Generally, a method is taken in which backup data is written back to the boot disk after the system is booted from a read-only OS medium, such as a CD-ROM. In this case, in the OS boot system, the OS medium takes the place of the boot disk, and the kernel initialization can be achieved by the same processing as that illustrated in the flowchart of FIG. 4.

There is known a method and a system that create an OS having selected functions for use as a conventional art relating to the present invention. [Patent Document 1] Japanese Laid-open Patent Publication No. 2003-099268

In the case where the backup data is written back, the write-back operation needs to be performed after the core kernel is made to recognize the external storage device in which the backup data has been stored at system boot time. However, in the case where the storage device driver functioning as a program for driving the external storage device is not recorded in the OS medium such as a CD-ROM, the core kernel cannot recognize the external storage device, disabling the write-back of the backup data. To solve this problem, it is necessary to temporarily replace the OS medium with a medium containing the driver of the storage device after the system has been booted from the OS medium. However, the OS medium is in a mount state, so that unmount of the file system of the OS medium cannot be made, making it impossible to perform replacement of the OS medium and storage device driver.

Figure 17:
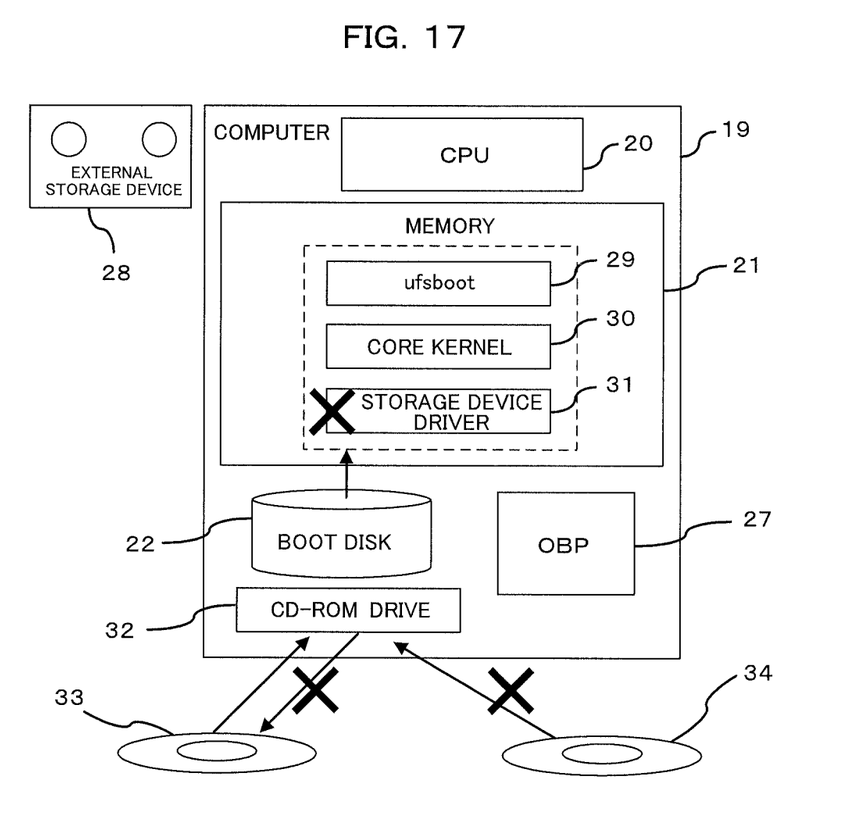
FIG. 17 is a conceptual view of boot disk restoration in the conventional OS boot system using CD-ROM medium.

FIG. 17 is a conceptual view of boot disk restoration in the conventional OS boot system using CD-ROM medium. As illustrated in FIG. 17, it is impossible to eject an OS medium 33 during operation of the OS. Further, the OS medium 33 is present in a CD-ROM drive 32 and therefore a storage device driver medium 34 cannot be set. As a result, a storage device driver 31 cannot be read, and the restoration of the boot disk 22 cannot be performed.

SUMMARY

According to an aspect of the invention, an information processing apparatus provided with a central processing unit and a storage device, includes: a first recording medium that performs control of the information processing apparatus, stores a first system controller for allowing the central processing unit to execute boot processing of the information processing apparatus, and is accessed by using a first access path in a tree structure or by using a second access path different from the first access path based on a first conversion table representing a correspondence between the first access path and second access path; a memory disk generation section that allows the central processing unit to secure, as a predetermined storage area of the storage device, a memory disk section that operates as a second recording medium different from the first recording medium and is accessed by using a third access path in a tree structure; a conversion table generation section that allows the central processing unit to generate a second conversion table representing a correspondence between the second access path and third access path; and a duplication controller that allows the central processing unit to copy the first system controller onto the memory disk section as a second system controller and allows the central processing unit to duplicate the first and second system controllers based on the second conversion table.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An Embodiment of the present invention will be described below with reference to the accompanying drawings.

First, a configuration of a computer in an OS boot system using CD-ROM medium according to the present invention will be described.

Figure 1:
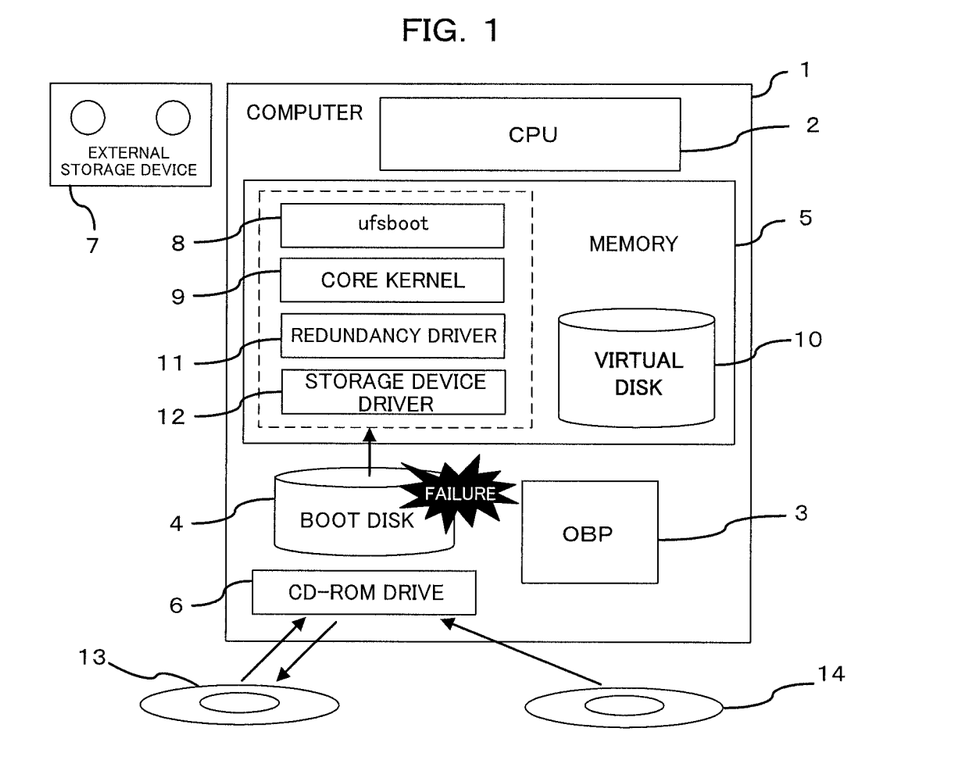
FIG. 1 is a block diagram illustrating an example of a configuration of a computer in an OS boot system using CD-ROM medium according to an embodiment of the present invention.
Figure 2:
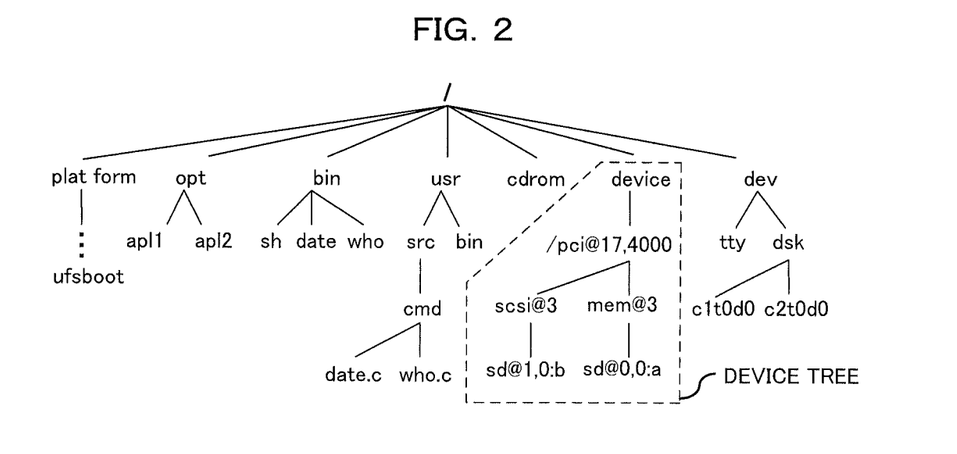
FIG. 2 is a conceptual view illustrating an example of a tree structure of a root file system according to the present embodiment.
Figure 3:
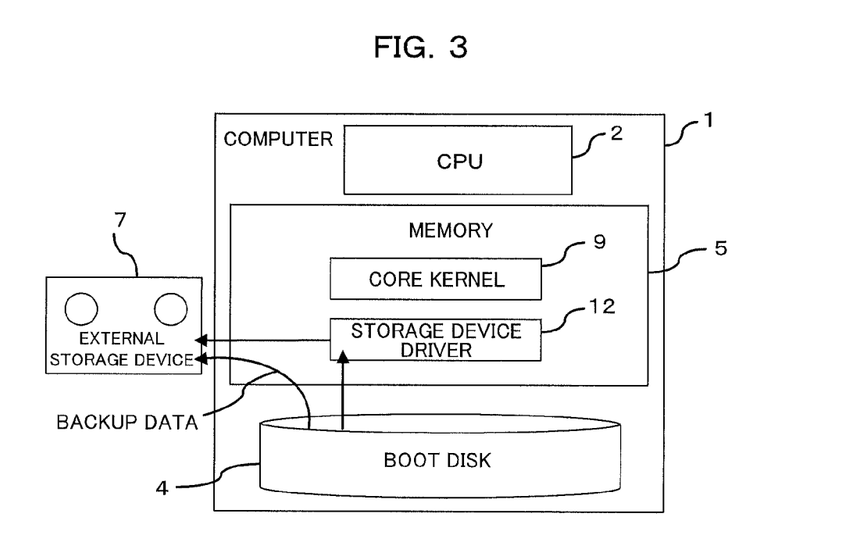
FIG. 3 is a conceptual view of a backup system of a boot disk according to the present embodiment.

FIG. 1 is a block diagram illustrating an example of a configuration of a computer in an OS boot system using CD-ROM medium according to an embodiment of the present invention. FIG. 2 is a conceptual view illustrating an example of a tree structure of a root file system according to the present embodiment. FIG. 3 is a conceptual view of a backup system of a boot disk according to the present embodiment. A computer 1 illustrated in FIG. 1 includes a CPU 2 (Central Processing Unit), an OBP 3, a boot disk 4, a memory 5 (storage device), a CD-ROM drive 6, an external storage device 7, an OS medium 13 (first recording medium), and a storage device driver medium 14. The memory 5 includes a ufsboot 8, a core kernel 9 (memory disk generation section, mount controller), a virtual disk 10 (memory disk section), a redundancy driver 11 (conversion table generation section, duplication controller), and a storage device driver 12 which are expanded by programs to be described later. Although only one CPU is provided in the present embodiment, a multi-CPU system in which a plurality of CPUs are provided may be adopted.

The CPU 2 executes all processing performed on the computer 1. The OBP 3 is a ROM that is booted first at power-on time, in which a firmware program that performs OS boot processing is recorded. The boot disk 4 contains a program required for booting the OS to be expanded on the memory 5 as illustrated in FIG. 1 and is configured by a device tree constructed by physical paths or a root file system constructed by logical paths as illustrated in FIG. 2. In the present embodiment, it is assumed that the boot disk 4 is being broken down, so that the OS medium 13 serves as the boot disk 4. The memory 5 is a volatile storage medium. The CD-ROM drive 6 reads data written in the CD-ROM. In the present embodiment, the OS medium 13 is assumed to be set in the CD-ROM drive 6.

The external storage device 7 is a storage device, such as a tape drive, in which backup data of the boot disk 4 has been stored as a hedge against a failure of the boot disk 4. In the present embodiment, the backup data of the boot disk 4 has been stored before the occurrence of the failure of the boot disk by the same processing as in the conventional art, as illustrated in FIG. 3. The OS medium 13 is a computer-readable portable storage medium and is, e.g., a CD-ROM. The OS medium 13 stores programs (first system controller) for OS boot and plays the same role as the boot disk. The storage device driver medium 14 is, e.g., a CD-ROM and stores the storage device driver 12. The storage device driver 12 is a driver for driving the external storage device 7.

The ufsboot 8 is a boot program. The core kernel 9 performs incorporation of the kernel module or daemon as initialization of the kernel. Details of the virtual disk 10 and redundancy driver 11 will be described later. These four programs are stored in the boot disk 4 and OD medium 13, respectively.

The virtual disk 10 is so-called a memory disk, which is a virtual disk created in the memory enabling higher speed access than reading/writing speed of a general disk. Specifically, the kernel secures a recording area dedicated for the virtual disk in the memory, and the virtual disk is operated by the driver for assigning, to the dedicated storage area, the physical and logical paths prepared in the kernel. An access path equivalent to that in a general disk is provided from the kernel.

The redundancy driver 11 makes the boot disk redundant. When the boot disk is broken down, the operation of the entire OS (kernel) cannot be guaranteed and, in the worst case, the system may halt. To avoid this, there exists a mechanism of "redundancy (duplication) of boot disk". In this mechanism, a plurality of boot disks are prepared and, if one boot disk has been broken down, access is passed to another boot disk. More specifically, in the redundancy of the boot disk, the physical paths of the plurality of boot disks are associated with the logical path of one boot disk, and an access command to the physical path of the boot disk is converted into commands to be sent to the physical paths of the plurality of disks. There are several methods for achieving redundancy of the boot disk and, among them, there is a generally-accepted method in which a redundancy driver that fakes a plurality of boot disks as a single boot disk is incorporated in the OS.

Figure 4:
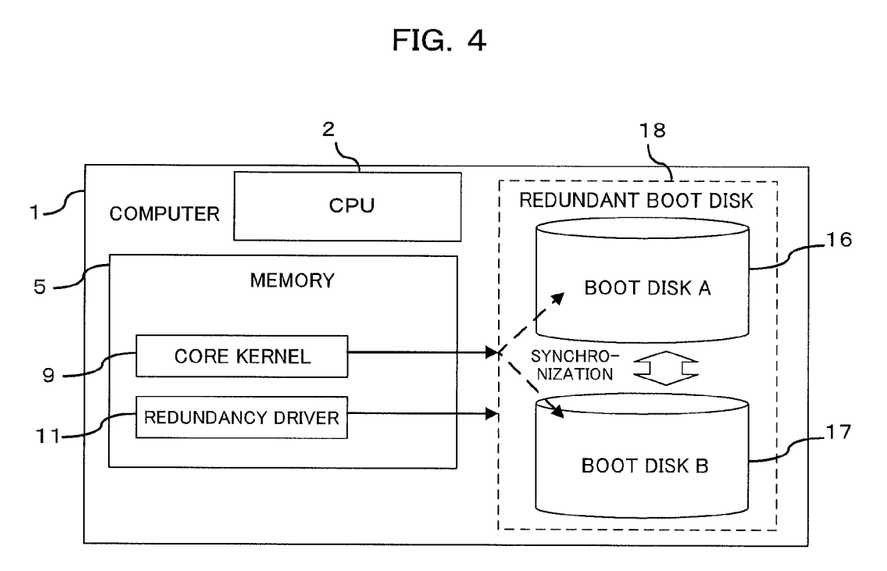
FIG. 4 is a conceptual view of a disk redundant configuration.

FIG. 4 is a conceptual view of a disk redundant configuration. As illustrated in FIG. 4, a boot disk A16 and a boot disk B17 are treated as a redundant boot disk 18 by the redundancy driver 11. The core kernel 9 performs reading/writing operation with respect to the redundant boot disk 18 officially; actually however, the reading/writing operation is performed with respect both to the boot disk A16 and boot disk B17. Details of operation of the redundancy driver 11 will be described later.

Next, operation of the computer in the OS boot system using CD-ROM medium according to the present embodiment will be described.

Figure 5:
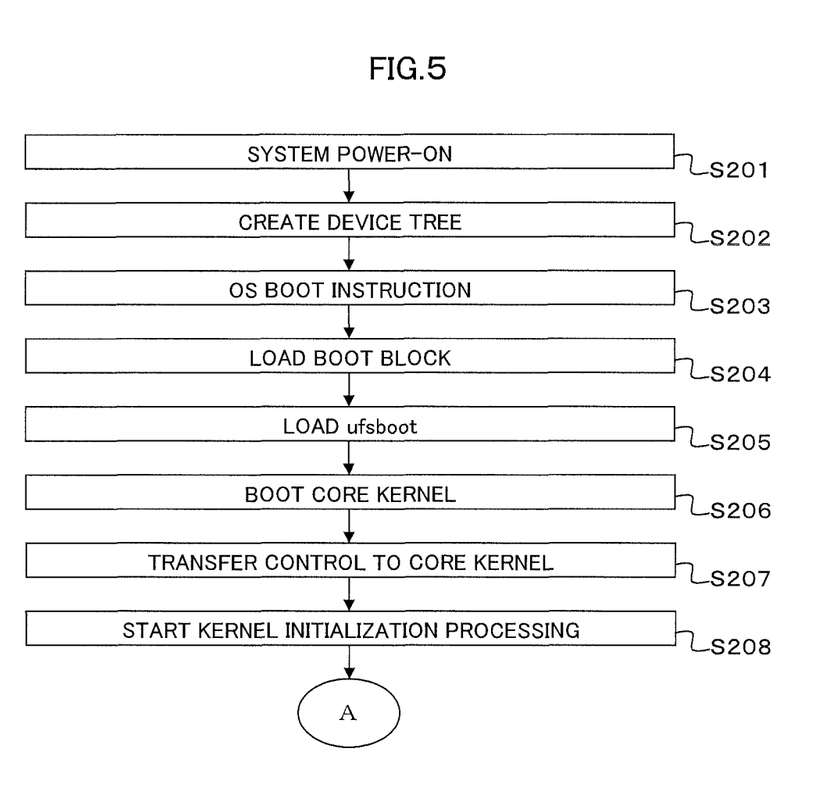
FIG. 5 is a flowchart of OS boot processing of the computer in the OS boot system using CD-ROM medium according to the present embodiment.
Figure 6:
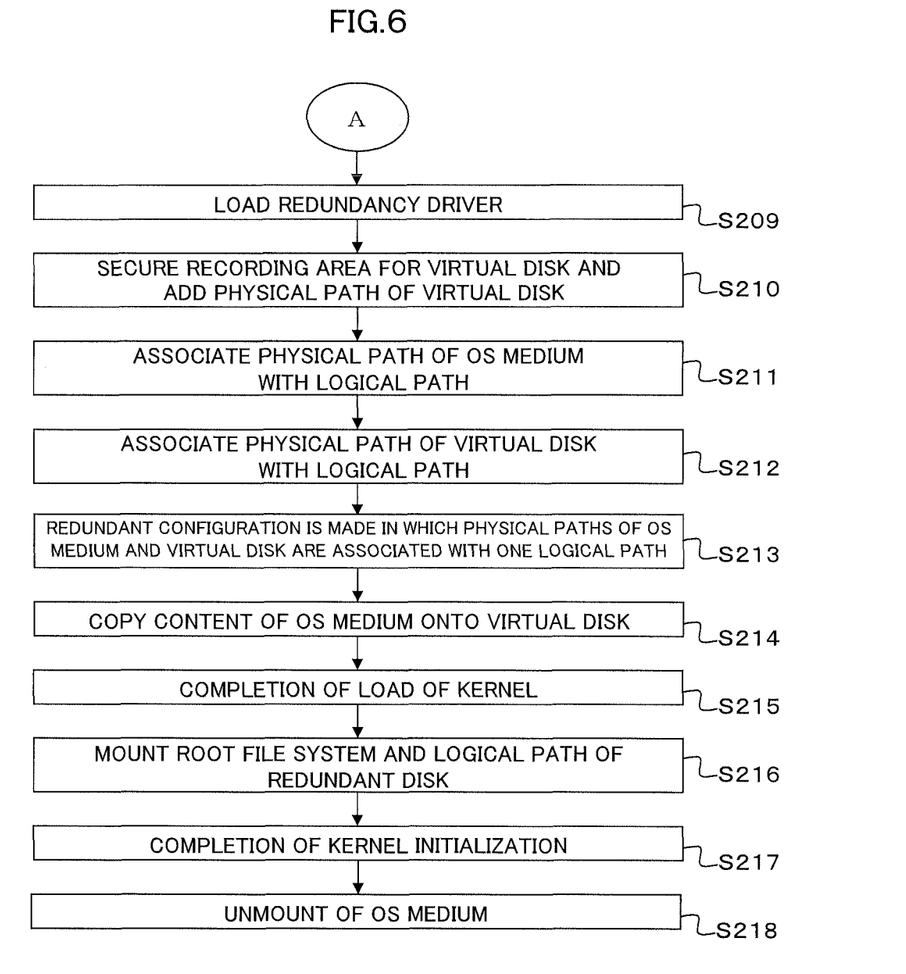
FIG. 6 is a flowchart of OS boot processing of the computer in the OS boot system using CD-ROM medium according to the present embodiment.

FIGS. 5 and 6 are each a flowchart of OS boot processing of the computer in the OS boot system using CD-ROM medium according to the present embodiment. The following processing are executed by the CPU 2. First, when power of the computer 1 is turned on by a user (S201), the OBP 3 starts an automatic boot process to recognize a hardware configuration and creates a device tree as illustrated in FIG. 2 (S202).

After creating the device tree, the OBP 3 issues an OS boot instruction (S203) and expands a boot block stored in the beginning of the OS medium 13 on the memory 5 (S204). The storage location of the ufsboot 8 which is a boot program stored in the root file system constructed on the OS medium 13 has been written in the boot block. The OBP 3 reads the ufsboot 8 with reference to the written storage location and loads the ufsboot 8 onto the memory 5 (S205). The loaded ufsboot 8 boots the core kernel 9 (S206) and transfers control to the core kernel 9 (S207).

As illustrated in FIG. 2, after the transfer of the control to the core kernel 9, the core kernel 9 mounts (/=/devices/pci@17, 4000/scsi@3/sd@1, 0:b), in a read-only attribute, a physical path (/devices/pci@17, 4000/scsi@3/sd@1, 0:b) of the OS medium 13 which has been given from the ufsboot 8 and the root (/) of the root file system. After the mount of the physical path and root of the root file system, the core kernel 9 searches the root file system for a required kernel module, loads the found kernel module onto the memory 5, and starts the kernel initialization processing (S208).

After the start of the kernel initialization processing, the core kernel 9 loads the redundancy driver 11 stored in the OS medium 13 onto the memory 5 (S209). After loading the redundancy driver 11, the core kernel 9 secures a recording area for the virtual disk 10 in the memory 5 and adds the physical path (/devices/pci@17, 4000/mem@3/sd@0, 0:a) of the virtual disk 10 to the device tree retained by the OBP 3 (S210). After adding the physical path to the virtual disk 10, the core kernel 9 associates logical paths with the physical paths of the virtual disk 10 and OS medium 13 based on the device tree retained by the OBP 3 (S211, S212).

Figure 7:
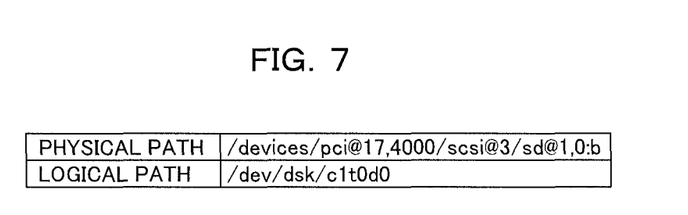
FIG. 7 is a physical path-logical path correspondence table of OS medium according to the present embodiment.
Figure 8:
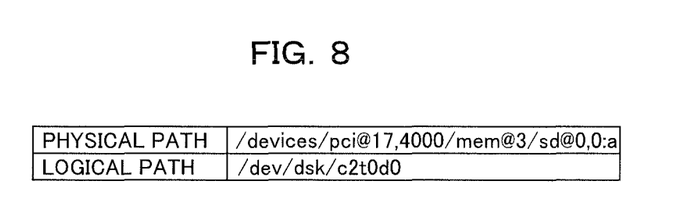
FIG. 8 is a physical path-logical path correspondence table of virtual disk according to the present embodiment.

Here, association between the physical and logical path will be described. FIG. 7 is a physical path-logical path correspondence table of OS medium according to the present embodiment. FIG. 8 is a physical path-logical path correspondence table of virtual disk according to the present embodiment. As illustrated in FIGS. 7 and 8, correspondence tables of the OS medium 13 and virtual disk 10 are created. The logical path of the OS medium 13 is previously recorded in the OS medium 13 as a "disk mount correspondence table (first conversion table)". More specifically, the logical path of the OS medium 13 is previously prepared as a physical path for associating the OS medium 13 with a device (in the present embodiment, CD-ROM drive 6) for reading the OS medium 13.

As illustrated in FIG. 5, after the creation of the above correspondence tables, the redundancy driver 11 is activated to create a correspondence table (second conversion table) in which the physical path (/devices/pci@17, 4000/scsi@3/sd@1, 0:b <first access path>) of the OS medium 13 and physical path (/devices/pci@17, 4000/mem@3/sd@0, 0:a <third access path>) of the virtual disk are associated with the logical path (/dev/dsk/c1t0d0 <second access path>) of the OS medium 13 (S213). The physical path of the OS medium 13 and physical path of the virtual disk may be associated with one unique logical path (e.g., /dev/sfdsk/c0t0d0). Further, the physical path of the OS medium 13 and physical path of the virtual disk may be associated with the logical path of the virtual disk.

Figure 9:
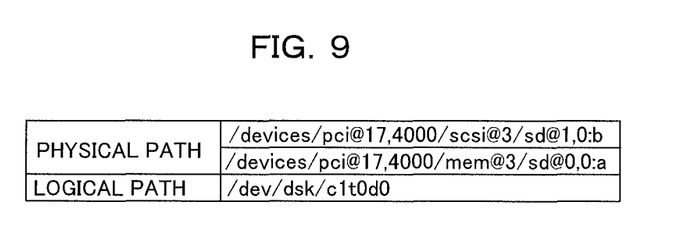
FIG. 9 is a physical path-logical path correspondence table for redundancy according to the present embodiment.

Here, a correspondence table in which the physical paths of the OS medium 13 and virtual disk are associated with the logical path of the OS medium 13 will be described. FIG. 9 is a physical path-logical path correspondence table for redundancy according to the present embodiment. The redundancy driver 11 creates the physical path-logical path correspondence table (second conversion table) as illustrated in FIG. 9. The OS medium 13 and virtual disk 10 are associated with each other for redundancy by the association defined by the correspondence table and are treated as one boot disk in terms of the logical path. For example, when the logical path of the OS medium 13 is accessed, the actual access is made to both the OS medium 13 and virtual disk.

After creating the correspondence table, the redundancy driver 11 copies the OS (first system controller) recorded in the OS medium 13 onto the virtual disk 10 (S214) as illustrated in FIG. 6, whereby the load of the kernel is completed (S215). With this operation, the virtual disk 10 retains the OS (second system controller) in its recording area.

After completion of the load of the kernel, the core kernel 9 refers to the disk mount correspondence table (/→/dev/dsk/c1t0d0) previously retained in the OS medium 13 or corresponding table of FIG. 9 in which the physical paths of the OS medium 13 and virtual disk are associated with the logical path of the OS medium 13 to mount (/→/dev/dsk/c1t0d0), in a readable/writable attribute, the logical path (/dev/dsk/c1t0d0) of the redundant boot disk (OS medium 13 and virtual disk) on the root (/) of the root file system, as illustrated in FIG. 2 (S216), whereby the kernel initialization processing is completed (S217).

After completion of the kernel initialization, the core kernel 9 releases (unmount) the mount of the OS medium 13 and root file system (S301). As a result, the mount of the OS medium 13 on the root (/) of the root file system is disabled, allowing the OS medium 13 to be ejected. That is, the CD-ROM medium as the OS medium 13 can be ejected from the CD-ROM drive 6.

The access path to the virtual disk 10 which is remaining one of the disks constituting the redundant disk still exists, so that the core kernel 9 still recognizes the virtual disk 10 as the boot disk, allowing the system operation to continue. The core kernel 9 can unmount the OS medium 13 in the wake of an OS medium 13 ejection command issued from a user or application.

After the kernel initialization processing has been completed by the configuration/processing of the present embodiment, it is possible to restore the broken boot disk 4 using the backup data of the boot disk 4 stored in the external storage device 7.

Figure 10:
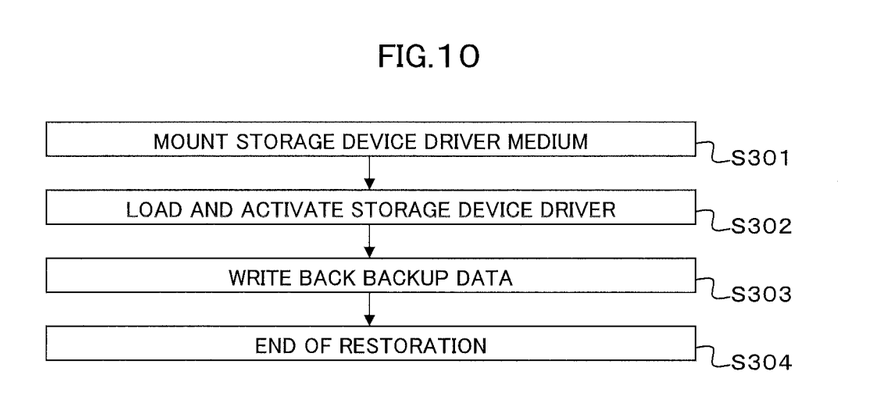
FIG. 10 is a flowchart of restoration processing of a boot disk in the OS boot system using CD-ROM medium according to the present embodiment.

FIG. 10 is a flowchart of restoration processing of the boot disk in the OS boot system using CD-ROM medium according to the present embodiment. First, when a user sets the storage device driver medium 14 in the CD-ROM drive 6, the core kernel 9 associates the physical path (/cdrom) of the storage device driver medium with the logical path (/dev/dsk/c1t0d0) and mounts the logical path on the root (/) of the root file system as illustrated in FIG. 2 (S301). After the mount on the root file system, the core kernel 9 loads the storage device driver 12 stored in the storage device driver medium 14 onto the memory 5 and activates the loaded storage device driver 12 (S302). The activation of the storage device driver 12 allows the core kernel 9 to recognize the external storage device 7, writes back the backup data stored in the external storage device 7 (S303) to restore the boot disk 4, and ends the processing (S304).

According to the present embodiment, the redundant configuration of the OS medium and virtual disk allows the OS medium such as a CD-ROM to be ejected at the time of restoration of the system disk in the CD-ROM boot system. More specifically, even after the OS medium has been ejected, the access path to the virtual disk still exists, so that the kernel still recognizes the boot disk, allowing the system operation to continue. Thus, it is possible to incorporate a required driver module in the boot system using CD-ROM medium. Further, providing the virtual disk can make the boot disk redundant without preparing an additional disk, thereby increasing the reliability of the entire system.

The disclosed information processing apparatus and its control method can be embodied in various forms, without departing from the spirit or the main feature. Therefore, the aforementioned embodiment is merely illustrative of the invention in every aspect, and not limitative of the same. The scope of the present invention is defined by the appended claims, and is not restricted by the description herein set forth. Further, various changes and modifications to be made within the scope of the appended claims and equivalents thereof are to fall within the scope of the present invention.

According to the disclosed information processing apparatus and its control method, it is possible to incorporate a required driver module in the CD-ROM boot system without preparing an additional disk or install server at the time of restoration of the system disk in the CD-ROM boot system. Further, it is possible to make the boot disk redundant without preparing an additional disk, thereby increasing the reliability of the entire system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions has been described in detail, it should be understood that the various changes, substitutions, and alterations could be made hereto without departing from the spirit and scope of the invention.

What is claimed is:

1. An information processing apparatus provided with a processor and a main memory, comprising:
    a first recording medium that stores a first operating system performing control of the information processing apparatus that directs the processor to execute boot processing of the information processing apparatus, and is accessed by using a first access path in a tree structure or by using a second access path based on a first conversion table representing a correspondence between the first access path and the second access path;
    a virtual disk generation section that directs the processor to secure a virtual disk which is accessed by using a third access path in a tree structure and which is a predetermined storage area in the main memory;
    a conversion table generation section that directs the processor to generate a second conversion table representing a correspondence between the second access path and the third access path;
    a duplication controller that directs the processor to copy the first operating system onto the virtual disk as a second operating system and directs the processor to duplicate the first operating system and the second operating system based on the second conversion table; and
    a mount controller that directs the processor to associate the first access path and the third access path with the second access path based on the first conversion table or the second conversion table and, when receiving removal of the first recording medium, directs the processor to release the association between the first access path and the second access path to remove the first recoding medium.

2. The information processing apparatus according to claim 1, wherein,
    in the case where the first operating system is accessed by using the second access path based on the second conversion table after the duplication controller directs the processor to duplicate the first operating system and the second operating system, the access to the first system control program is made to both of the first operating system and the second operating system.

3. The information processing apparatus according to claim 1, wherein
    after the mount controller directs the processor to associate the third access path and the second access path based on the second conversion table and the duplication controller directs the processor to duplicate the first operating system and the second operating system, the mount controller directs the processor to release the association between the first access path or the third access path and the second access path based on the second conversion table.

4. A control method of an information processing apparatus provided with a processor and a main memory, the method comprising:
    directing the processor to secure a virtual disk which is accessed by using a third access path in a tree structure and which and which is predetermined storage area in the main memory;
    storing a first operating system performing control of the information processing apparatus in a first recording medium that directs the processor to execute boot processing of the information processing apparatus, and being accessed by using a first access path in a tree structure or by using a second access path based on a first conversion table representing a correspondence between the first access path and second access path;
    directing the processor to generate a second conversion table representing a correspondence between the second access path and the third access path;
    directing the processor to copy the first operating system onto the virtual disk as a second operating system;
    directing the processor to duplicate the first operating system and the second operating system based on the second conversion table; and
    directing the processor to associate the first access path and the third access path with the second access path based on the first conversion table or the second conversion table and, when receiving removal of the first recording medium, directing the processor to release the association between the first access path and the second access path to remove the first recording medium.

5. The control method according to claim 4, wherein,
    in the case where the first operating system is accessed by using the second access path based on the second conversion table after the duplicating of the first operating system and the second operating system, the access to the first operating system is made to both of the first operating system and the second operating system.

6. The control method according to claim 4 further comprising, after directing the processor to associate the third access path and the second access path based on the second conversion table and directing the processor to duplicate the first operating system and the second operating system, directing the processor to release the association between the first access path or the third access path and the second access path based on the second conversion table.

7. A computer-readable storage medium storing a control program of an information processing apparatus provided with a processor and a main memory, the program causing the processor to execute a process comprising:

securing a virtual disk which is accessed by using a third access path in a tree structure and which is a predetermined storage area in the main memory;
storing a first operating system performing control of the information processing apparatus in a first recording medium that directs the processor to execute boot processing of the information processing apparatus, and being accessed by using a first access path in a tree structure or by using a second access path based on a first conversion table representing a correspondence between the first access path and second access path;
generating a second conversion table representing a correspondence between the second access path and the third access path;
copying the first operating system onto the virtual disk as a second operating system;
duplicating the first operating system and the second operating system based on the second conversion table; and
associating the first access path and the third access path with the second access path based on the first conversion table or the second conversion table and, when receiving removal of the first recording medium, directing the processor to release the association between the first access path and the second access path to remove the first recording medium.

8. The computer-readable storage medium according to claim 7, wherein,
in the case where the first operating system is accessed by using the second access path based on the second conversion table after the duplicating of the first operating system and the second operating system, the access to the first operating system is made to both of the first operating system and the second operating system.

9. The computer-readable storage medium according to claim 7, wherein the process further comprising, after the associating the third access path and the second access path based on the second conversion table and the duplicating the first operating system and the second operating system, releasing the association between the first access path or the third access path and the second access path based on the second conversion table.

* * * * *

UNITED STATES PATENT AND TRADEMARK OFFICE
CERTIFICATE OF CORRECTION

PATENT NO.         : 8,667,262 B2
APPLICATION NO.    : 12/970341
DATED              : March 4, 2014
INVENTOR(S)        : Nukuda et al.

Page 1 of 1

It is certified that error appears in the above-identified patent and that said Letters Patent is hereby corrected as shown below:

In the Claims

Column 9, Line 65, In Claim 1, delete "recoding" and insert -- recording --, therefor.
Column 10, Line 24, In Claim 4, delete "and which and which" and insert -- and which --, therefor.

Signed and Sealed this
Third Day of June, 2014

Michelle K. Lee
*Deputy Director of the United States Patent and Trademark Office*